Feb. 14, 1933. G. F. FRENCH 1,897,472
APPARATUS FOR MEASURING DIFFERENTIAL SPEED
Filed Oct. 25, 1929 2 Sheets-Sheet 1
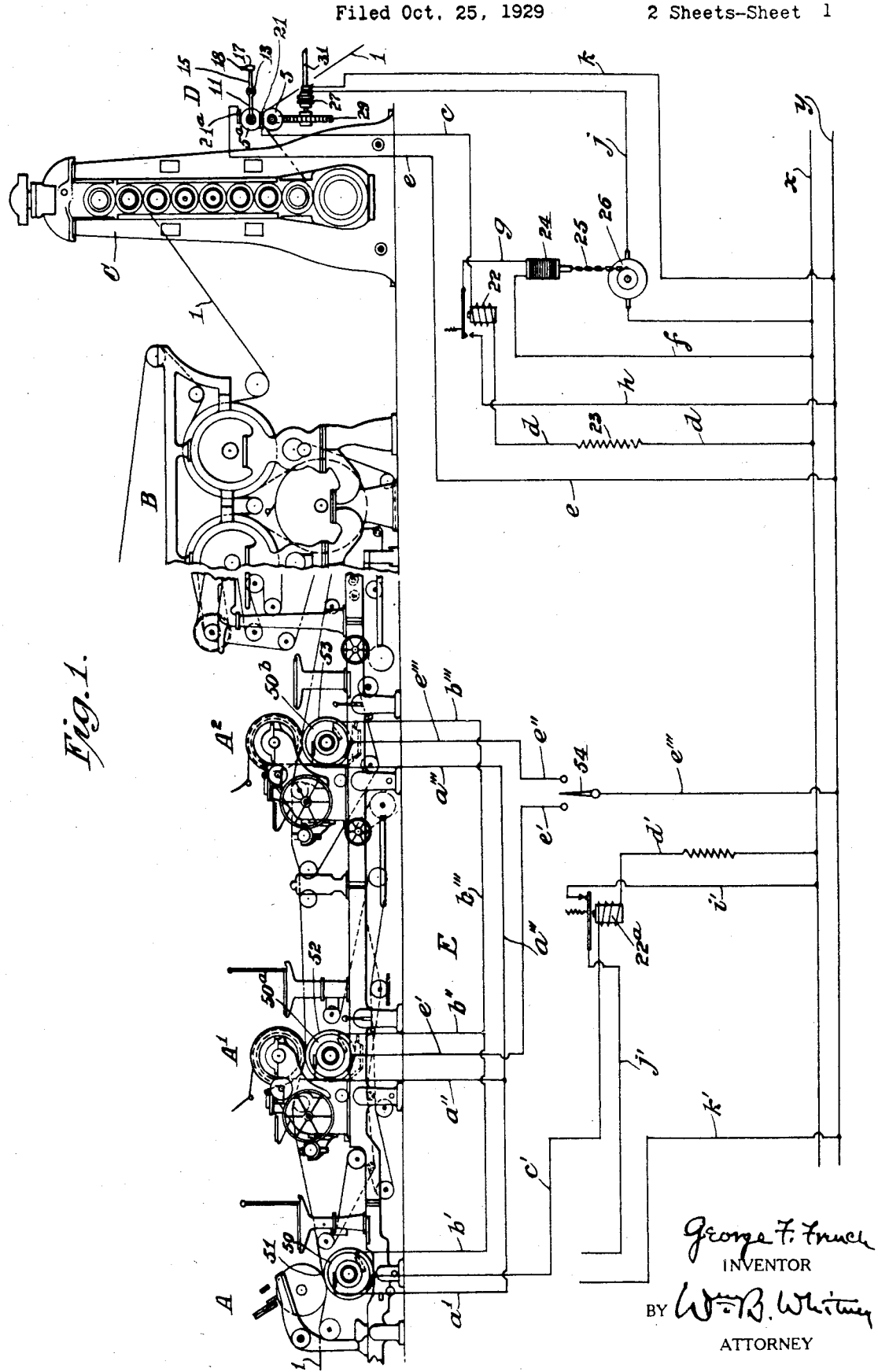

Feb. 14, 1933. G. F. FRENCH 1,897,472
APPARATUS FOR MEASURING DIFFERENTIAL SPEED
Filed Oct. 25, 1929 2 Sheets-Sheet 2
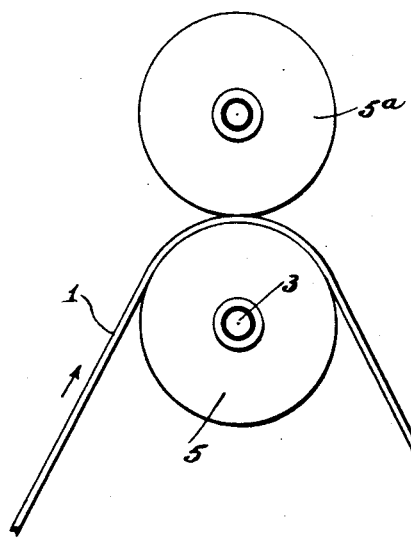
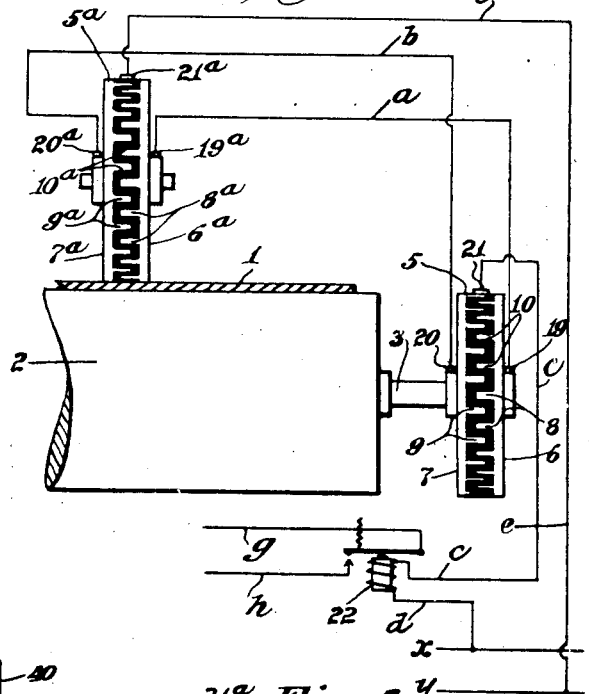
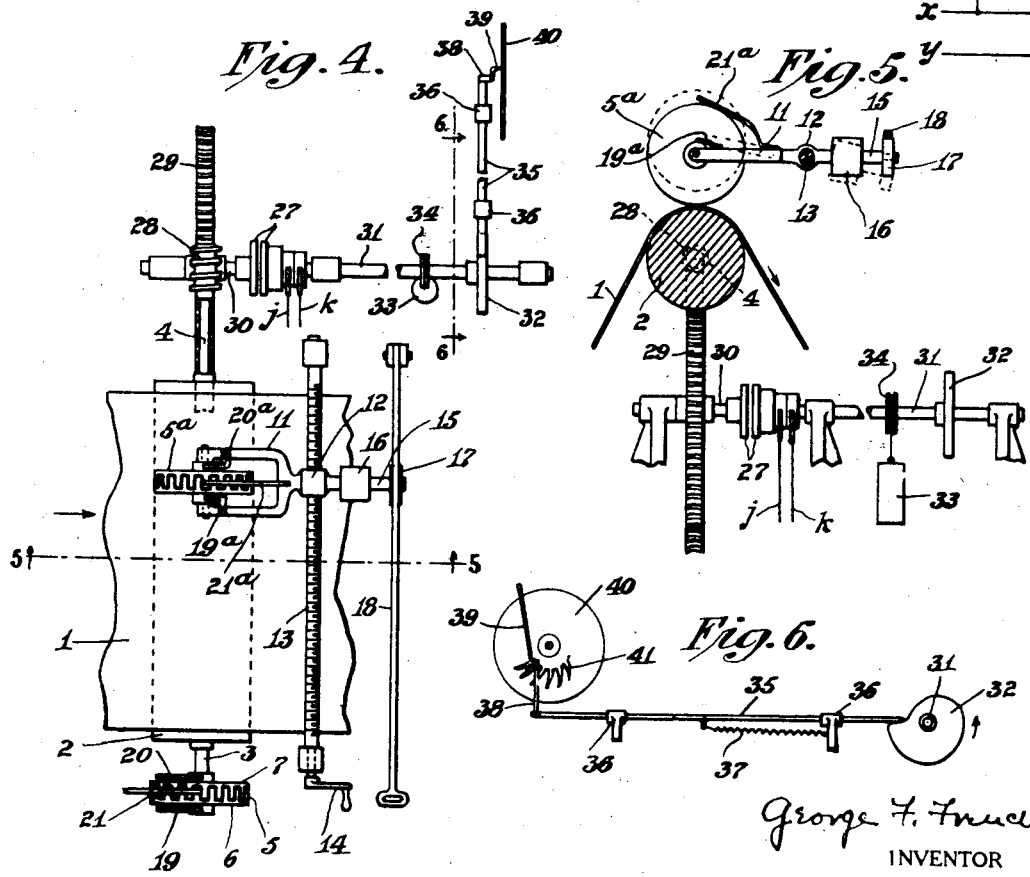
George F. French
INVENTOR
BY W. B. Whitney
ATTORNEY Patented Feb. 14, 1933

1,897,472

UNITED STATES PATENT OFFICE

GEORGE F. FRENCH, OF STAMFORD, CONNECTICUT, ASSIGNOR TO RIEGEL PAPER CORPORATION, OF RIEGELSVILLE, NEW JERSEY, A CORPORATION OF NEW JERSEY

APPARATUS FOR MEASURING DIFFERENTIAL SPEED

Application filed October 25, 1929. Serial No. 402,535.

This invention relates to apparatus for measuring, and indicating and/or recording or otherwise utilizing, small differences in the speed of two moving parts, such as shafts, surfaces, and the like; which apparatus, while capable of use in various fields and for many different purposes, is particularly adapted for use, in industries in which material is made up in a continuous web or filament, for measuring the thickness or diameter of the same, and, more specifically as herein shown and described, for measuring the thickness of the paper on a paper machine and, if desired, the differential speed of different sections of the machine. It may also be used to measure the crown of the calender rolls.

There are at present on the market several quite different devices for measuring the thickness of paper as it is being made on a paper machine. One of these devices comprises a revolving roll with fixed bearings over which the paper or paper board is carried, a small roller or wheel mounted to bear upon the upper surface of the paper immediately over the roll and capable of moving up and down according to variations in the thickness of the paper, and an indicating micrometer actuated by such upward and downward movement of the wheel by which to read the thickness of the paper. With this device, provided the roll and wheel are in good mechanical condition and the play in their bearings is not excessive, it is possible to measure the thickness of paper to within about 0.0005 of an inch in thickness and therefore the device will, so long as it remains in good condition, give commercially satisfactory results when used for measuring very thick papers where an error of 0.0005 of an inch is not very important; but it is entirely impracticable for use with thin papers of from 0.002 to 0.003 of an inch thickness since with such paper the percentage error is far too great for commercial practice. Another device involves tuned radio circuits and consists in controlling such circuits by running the paper between the plates of a condenser, the paper thus constituting the dielectric of the condenser, but such device is not only expensive but difficult to maintain in proper condition since the readings of the instrument are effected by variations in both the moisture and chemical content of the paper and by other conditions.

The specific object of my present invention is to provide apparatus for measuring the thickness of paper, and especially of thin papers, which is simple in its construction, is substantially permanent in its adjustments, and is capable of practically any desired precision of measurement.

It is known that if a moving web or filament is caused to travel in the arc of a circle, as when carried over and partially around a roll or drum, its outer surface will travel at a higher speed than will its inner surface through such arcuate path, such difference in the speed of the two surfaces being represented by the equation $$\frac{vt}{r + t/2},$$

in which $v$ is the linear speed of the moving web midway its outer and inner surfaces, $t$ is the thickness of the web, and $r$ is the radius of the circle described by the inner surface of the web.

The above equation is for all practical purposes equivalent to the equation $$\frac{vt}{r}$$

when dealing with very thin webs such as the usual light weights of paper, since by giving to $r$ a value of say six inches the error therein, although possibly amounting to 0.4 percent. on a web of 0.050 of an inch in thickness, will approximate 0.02 per cent. only on a web of 0.002 inch thickness. It is therefore seen that if, in a paper machine, the paper is carried partially around and causes to rotate without slipping a roll of relatively small diameter and a wheel is mounted to bear against the outer arcuate surface of the paper and is driven thereby also without slipping, the difference in the peripheral speeds of the roll and wheel, being the difference in the speeds of the two surfaces of the paper, is directly proportional to the linear speed of the paper multiplied by its thickness and is inversely proportional to the radius of the roll.

By my present invention I have produced an apparatus which, based upon the above law, is capable of accurately measuring such slight differences in surface or peripheral speeds, and, further, by eliminating the effect of the variable factor $v$ of indicating and recording, and if desired of automatically controlling through known control means, the thickness of the paper.

The invention comprises, as its principal and basic feature, an electric circuit and at least two commutators, or commutator-like members or elements, which are mounted to be driven at speeds proportioned respectively to the speeds of the two members or surfaces the speed difference of which is to be measured and are adapted by their joint action to effectively make and break the circuit at a rate proportional to such speed difference, and hence, as stated, at a rate closely approximating $$\frac{vt}{r}.$$

Conversely, the length of the time interval during which the circuit is open and closed respectively will correspondingly approximate $$\frac{r}{vt}.$$

The actual frequency and length of the time intervals of the closing and opening of the circuit will of course depend upon the design of the apparatus.

For certain uses, where it is desired merely to measure the actual gain in speed of one member or part over another, a suitable frequency meter can be connected to the circuit controlled as described; and, if used in conjunction with a device for registering the speed of one, say the slower moving, of the two members or parts, will give the approximate percentage difference in their speeds.

For more accurate results, as required in measuring the thickness of paper for example, I have provided, as a second feature of my invention, a special indicating and/or recording mechanism which comprises, briefly stated, a finger mounted either pivotally or to be actuated in a straight line by a suitable rotatably mounted member such as a cam and normally biased to a fixed starting or zero position, means such for instance as a magnetic clutch for operatively connecting the finger or actuating cam with a member driven by the machine at a speed, preferably much reduced, proportional to $v$, and means for controlling the circuit of the clutch magnet from the first, or what may be designated as the primary, control circuit. The finger will accordingly be operatively connected with and disconnected from the machine at a frequency closely approximating $$\frac{vt}{r}$$

and for time intervals of $$\frac{r}{vt};$$

and hence, since the distance travelled by the finger when connected with the machine is directly proportional to the speed multiplied by the time of its travel, namely, $$v \times \frac{r}{vt},$$

it is seen that the length of its travel is inversely proportional to $t$. Whence it follows that the distance travelled by the indicating and/or recording finger during each closure of the clutch magnet circuit is inversely proportional to the thickness of the paper, independent of any variations in the speed of the machine, and that the finger, measuring as it does the duration rather than the frequency of a movement, will in conjunction with a dial or chart suitably calibrated to the constant factors involved in the design of the apparatus provide a substantially exact reading of the thickness of the paper.

The invention also includes the further novel features hereinafter described and more particularly pointed out in the appended claims.

A practical embodiment of the invention in two of its applications to a paper machine is shown, by way of illustration and not of limitation, in the accompanying drawings, in which—

Figure 1 is a view of a paper machine equipped, in the preferred form thereof, with my new measuring apparatus for registering and recording both the thickness of the paper being made thereon and the differential speed of the several sections of the machine, showing a portion of the machine in side elevation with parts of the measuring apparatus as operatively related thereto and, diagrammatically, certain of the electrical circuits and associated mechanism; Fig. 2 is a detail showing in elevation the end, or rather side, of a commutator at the front end of a roll over and partially around which a paper web is passing and the end, or side, of a similar commutator resting upon and rotated by the moving paper web; Fig. 3 is a view, at right angles to that of Fig. 2, showing a portion of the roll, the commutator mounted upon the front end of its axle to rotate therewith, the similar commutator resting on the outer surface of the paper web, and the electrical circuits immediately associated therewith; Fig. 4 is a plan view of the mechanical parts of the entire apparatus as applied to the measurement of the thickness of the paper; Fig. 5 is a view partly in section and partly in elevation, on the line 5—5 of Fig. 4; and Fig. 6 is a detailed elevational view of the recording mechanism, on the line 6—6 of Fig. 4.

As shown in Fig. 1, A, A¹, A², B and C indicate respectively three successive press sections and the dryer section, or drying rolls, of a Fourdrinier paper machine and the usual stack of calender rolls attached thereto; D indicates collectively parts of the mechanism and electrical circuits of the apparatus for measuring the thickness of the paper being made upon the machine; and E likewise indicates parts of the mechanism and electrical circuits of similar apparatus as applied for measuring the difference in speed of the several press sections of the machine.

Referring first to the apparatus as used for measuring the thickness of the paper, the paper web 1 is carried over and partially around a roll 2, with axles 3 and 4, which may be conveniently located either between the drying and calender rolls or, as shown, to receive the paper as it leaves the calender rolls, and which is mounted in any suitable manner, as in anti-friction bearings in standards or side frames secured to the floor (not shown), so that it will cause the paper web to travel thereon in the arc of a circle and will be rotated thereby without slipping.

The commutator 5, which is a commutator-like member of a type generally resembling that of the commutator used in synchronous rectifiers is mounted as shown directly upon the axle of the roll 2, at its forward end for convenience of illustration, to rotate therewith. This commutator, in the preferred form here shown, is of the same diameter as the roll and consists of two copper disks 6 and 7 which, to reduce the effect of friction, are respectively provided on their outer faces with bearing hubs for the usual brushes and on their inner faces with a series of peripheral segments or crown teeth 8 and 9, and are arranged in spaced relationship so that the segments on one disk will extend midway between and suitably overlap the segments on the other disk; and they, and their segments, are insulated by suitable insulating material 10, and of course from the axle of the roll as by suitable bushings of insulating material. The roll and the commutator may conveniently have a radius of say six inches, and, for the use in view, each disk of the commutator is provided with say fifty segments which segments have a peripheral width of one-third the distance they are spaced apart so that the segments of the two disks will be separated from each other by an insulated space of equal width.

The second commutator 5ª, which is substantially a duplicate of the commutator 5, consists of the disks 6ª and 7ª similarly provided with outer bearing hubs for the brushes and staggered and overlapping inwardly extended segments 8ª and 9ª all separated by insulation 10ª. It may be mounted in any suitable manner to bear peripherally upon the paper web, at any part of its arcuate path, to be rotated thereby. As shown, however, it is journaled with anti-friction bearings in the forked end of a member 11 which is fulcrumed at 12 upon a screw-threaded rod 13, suitably supported at its ends and provided with a crank 14 at the forward end, which passes through a threaded opening in the enlarged bearing 12. The member 11 is provided with an arm 15 on which slides a weight 16 adapted to partially counterbalance the weight of the commutator and to suitably regulate the pressure with which it bears upon the paper web, and its outer end carries a sleeve 17 loosely fitting and slidable upon a lever rod 18 pivotally mounted at its rear end. The commutator can thus be raised out of contact with the paper web and shifted to any position transversely thereof by pressing down the free end of lever 18 and then turning the threaded rod 13.

The commutator 5 is equipped with brushes 19 and 20, which respectively bear upon the hubs of its two disks, and a third brush 21, which is mounted in any suitable manner to bear against the periphery of the commutator to contact successively with the segments first of one and then of the other of the two disks and the inter-segment insulation. The commutator 5ª is similarly equipped with two brushes 19ª and 20ª, which bear upon the hubs of its disks, and with a third brush 21ª, which bears against its periphery to contact successively with the segments of the disks and the inter-segment insulation. The brush 19, and hence the disk 6 of the commutator 5, is electrically connected by wire $a$ with the corresponding brush 19ª, and disk 6ª, of commutator 5ª, and the brush 20, and disk 7, of commutator 5 is similarly connected by wire $b$ with brush 20ª, and disk 6ª, of commutator 5ª. The third brush of one of the commutators, brush 21 of commutator 5 for instance, is connected by wire $c$ to the magnet coil of a relay 22 and thence by wire $d$ to line wire $x$, preferably through a resistance 23 to reduce the voltage in the circuit, or to one side of some other suitable source of electrical supply, while the third brush 21ª of commutator 5ª is connected by wire $e$ to the opposite side of the source of supply, as line wire $y$.

The operation of this basic feature of my apparatus is as follows: During the brief intervals in which the two commutators are in phase, that is to say, when the brushes 21 and 21ª are simultaneously making contact first with a segment 8 and 8ª, and then, after contacting with the intermediate insulation, with a segment 9 and 9ª, and so on, the circuit through the coil of the relay magnet will be opened and then reclosed at the rate of nearly sixteen thousand times per minute if, with a roll and commutators of six inch radius and with commutator disks provided with fifty segments each, the paper machine is running at five hundred feet per minute—a rate so rapid that the energized relay will not be affected thereby. Since, however, the commutator $5^a$ is being driven at a slightly faster rate of speed than the commutator 5 the segments of the former will gain upon those of the latter and brush $21^a$ will presently be making contact with the insulation intermediate two segments of commutator $5^a$ when brush 21 is in contact with a segment 9 or 8 of commutator 5, or contacting with a segment $8^a$ or $9^a$ when brush 21 is in contact with a segment 9 or 8 or with the intermediate insulation, and there will be no current through the magnet coil of the relay; and as the gain continues such permutations will continue, and the relay magnet will remain de-energized, until commutator $5^a$ has gained one complete segment upon commutator 5 and the two are again in phase, whereupon the magnet of the relay will again be energized. Thus, dependent upon the thickness of the paper and therefore the rate of the gain in speed of commutator $5^a$ upon commutator 5, the magnet of relay 22 will be energized perhaps six times per minute, or every ten seconds, and, accordingly, each time will remain energized about two and one-half seconds, with intervals of about seven and one-half seconds between the successive energizations.

The device provided for registering and recording the thickness of the paper as thus measured by the commutators is as shown actuated from the rear axle of the roll 2 through a magnetic clutch which is controlled by the relay 22.

To this end, the normally open switch contacts of relay 22 are arranged to control the actuating circuit, comprising wires $f$, $g$, and $h$, of a solenoid 24, which through a chain or other suitable connection 25 with its core operates the movable member of a standard or suitable "pull-type" switch 26. The switch 26, which by the successive pulls of the solenoid core is alternately snapped from off to on position and vice versa, in turn controls a circuit, comprising wires $i$, $j$ and $k$, through the magnet coil in one element of a magnetic clutch 27 by which a shaft 31 is operatively coupled to and uncoupled from a shaft 30, which shaft 30 is continuously driven but at greatly reduced speed from the axle 4 of roll 2 by a worm 28 fixed to the axle to mesh with a worm-gear 29 fixed on shaft 30. The shaft 31 carries fixed thereon a snail cam 32, which whenever the clutch is uncoupled is restored to normal starting position (see Fig. 6) by a weight 33 depending from a cord passed over a grooved pulley 34 fixed to the shaft.

A member 35, mounted to reciprocate in bearings 36, bears at one end against the peripheral face of the cam, with which it is held in contact by a spring 37, and at its outer end carries a finger 38, which finger cooperatively engages the free end of the pivotally mounted pen arm 39 of a standard, or any suitable, chart device comprising a paper record-disk 40, attached as usual to a disk mounted within a casing and rotated by clockwork (not shown), and the arm 39 pivoted upon the casing and carrying at its free end a pen point bearing upon the face of the paper disk.

It is apparent that the solenoid 24 will be energized every time the relay 22 is energized and closes the circuit through its coil, say six times per minute, and that the solenoid, acting through switch 26, will open and close the circuit through the magnet coil of clutch 27 half that number of times, or three times per minute, and each time the clutch will remain energized for a time interval of ten seconds and, intermediate thereof, will remain de-energized for the same time interval. Hence, the recording pen, actuated by cam 32 whenever shaft 31 is operatively coupled to shaft 30, will record say three readings per minute on the slowly revolving paper disk, in the form of slightly curved lines 41; and, upon the release of clutch 27, the cam and recording pen will at once be returned to their initial or starting positions by the weight 33. Furthermore, since the recording pen when moving travels at a rate directly proportional to the speed of the machine, the length of each line 41 made thereby will vary directly as the time interval of the movement, or ten seconds when, in the case assumed, the paper web is of a thickness to effect the energization of the magnet of the relay six times or every ten seconds per minute. With heavier paper the relay 22 will be energized more frequently, say seven times per minute, and hence the time interval during which the recording pen travels for each reading will be correspondingly shortened, and, on the other hand, on lighter paper the relay 22 will be energized less frequently, say five times per minute, and the time interval during which the recording pen is moved will be correspondingly lengthened. In all cases the length of the lines 41 will be inversely proportional to the thickness of the paper, and, on a recording chart suitably calibrated to the constant factors of the apparatus as designed—such as the diameter of roll 2, the pitch of the snail-cam, etc.,—will give readings of the actual thickness of the paper passing through the machine.

Apparatus of the design described, with a frequency of ten seconds more or less and allowing for a variation of perhaps one-fifth second in the operation of the relay, solenoid, switches and clutch, will provide readings good to 0.2 per cent. of the paper thickness, which on paper 0.003 inch thick will involve an error, insignificant in commercial practice, of 0.000006 inch only.

The apparatus can be additionally equipped with known means so as to also indicate and/or record the thickness of the paper at some remote point or points. It is also capable of functioning to automatically control the thickness of the paper being made on a paper machine—for example, by utilizing the movements of the member 35 or finger 38, or of the pen arm 39, to suitably control the actuating electric circuits either of known speed control mechanisms, for changing the speed of the machine, or of known valve adjusting mechanisms, for adjusting the valve which admits the paper stock to the machine.

It is obvious that one of the two copper disks of each commutator may be omitted, although it is believed that better and more accurate results can be obtained with commutators provided with two disks as shown and hereinabove described. Nor is it absolutely essential to use the commutator 5 at all, since substantially the same results can be obtained, but in a manner somewhat more complicated mechanically, by rotatably mounting the brush $21^a$ of commutator $5^a$ and causing it to revolve, through a suitable train of gears or otherwise, at precisely the same speed as the roll 2, or at least at a speed absolutely proportional thereto. Or, again, it may be found convenient to operate the commutator 5 at a speed differing materially from that of commutator $5^a$, either changing the design of one or both of the commutators accordingly or rotatably mounting the brush 21 of commutator 5 and causing it to revolve at a speed to exactly neutralize the increased speed of commutator 5—for example, quite satisfactory results have been obtained with apparatus in which the disks of commutator $5^a$, rotated by the moving paper web at comparatively low speed, were provided with 114 peripheral segments while the disks of commutator 5 carried six peripheral segments only but the commutator was rotated at a very high speed and its brush 21 was rotated through a speed changer by which the speed of its revolutions could be accurately regulated and adjusted.

It is further obvious that a special roll, such as the roll 2, is not required, since the commutators can be used in connection with any convenient roll of the machine, of suitable diameter, such as a calender roll, "sweat-roll", carrying roll, etc. However, in case a roll which is positively driven by the machine, not rotated solely by the moving paper web, is utilized for the purpose and the recording mechanism is also actuated through the clutch from the same roll, it might happen—for instance, on a break of the paper web—that commutator $5^a$ would bear directly upon the roll and hence the two commutators, if both of the same diameter as the roll, would be rotated at the same peripheral and angular speed and possibly in such relative position that the magnet of the clutch would remain energized and the shaft 31 and cam would be rotated for an indefinite period, thereby causing damage to the apparatus. This could be prevented by the installation of a suitable limit switch, but the switch might not prove satisfactory. Any possible trouble of this kind may, however, be effectually obviated by so designing the apparatus that on especially thin paper webs the commutator $5^a$ will run at a slightly slower speed than commutator 5 and will attain a speed equal to that of commutator 5 only on a certain increase in the thickness of the paper web; and, since for any particular design there would be a practical limit in the range of the thickness of the paper web capable of convenient measurement, there should perhaps be one design for paper ranging from say zero to 0.004 inch thickness, and a second for a thickness ranging from say 0.003 to 0.010 inch.

Each different section of a paper machine has to be run at a slightly different speed from that of every other section in order to give to the paper web a "draw" from one section to another sufficient to take up any slack therein and at the same time not produce a tension which will break the paper; and the nicety of the adjustments of the speeds of the several sections, which are commonly effected through a system of cone-pulleys and have to be made whenever the machine is changed from one grade of paper to another and from time to time on paper of the same grade as required by variations in the paper stock, is dependent upon the skill and judgment of the operator, based solely upon his observations of the "draw" of the paper in the operation of the machine.

For accurately determining the relative speed of two or more sections of a machine, as a basis for the adjustment thereof by the operator, a commutator, as shown in Fig. 1, is mounted upon the axle of, or otherwise associated with, the drive roll of each of the machine sections the speed of which is to be measured—three successive press sections of the machine as shown. Of these commutators, which are all alike, commutator 50, attached to the axle of the drive roll 51 of section A and here used as the base or reference commutator, corresponds to the commutator 5 hereinabove described, and each of the commutators $50^a$ and $50^b$, attached respectively to the axles of roll 52 of section $A^1$ and roll 53 of section $A^2$, corresponds to the commutator $5^a$. The brushes bearing on the hubs of one disk of commutator 50 and the corresponding disk of commutators $50^a$ and $50^b$ are connected together by wires $a'$ $a''$ and $a'''$, and the brushes bearing respectively on the hubs of the other disk of the three commutators are connected by wires $b'$ $b''$ and $b'''$. The third or peripheral brush of commutator 50 is connected by wire $c'$ to the coil of a solenoid $22^a$ and thence by wire $d'$ through a resistance to the line wire $x$, while the corresponding brushes of commutators $50^a$ and $50^b$ are connected one by wire $e'$ and the other by wire $e''$ to two contacts of a hand switch 54 and thence, through the switch, by wire $e'''$ to the line wire $y$.

Thus, when switch 54 is thrown over against the contact of wire $e'$, the relay $22^a$ will be energized whenever the commutator 50 and $50^a$ are in phase, and as they pass out of phase will be de-energized and remain de-energized until they again come into phase, as hereinabove explained, thus measuring the difference in the angular speed of the rolls 51 and 52 and hence the difference in the linear speed of the paper web travelling through sections A and $A^1$ of the machine; and, by throwing switch 54 over against the contact of wire $e''$, or relay $22^a$ will in like manner measure the difference in the angular speed of the rolls 51 and 53 and thereby the difference in the linear speed of the paper web travelling through sections A and $A^2$ of the machine. The relative speed of rolls $50^a$ and $50^b$ can be obtained from the measurements if the relative speed of rolls 50 and $50^a$ and of rolls 50 and $50^b$. By the use of two switches, if desired, it is obvious that any one of of the circuit wires $c'$ $e'$ and $e''$ can be connected through the relay to the line wire $x$ and either of the other wires connected to the line wire $y$ so that any one of the commutators can be used as the base or reference commutator for the measurement of the difference in speed of the section with which it is associated and that of any other section.

The relay $22^a$ may be like the relay 22 and the speed differences as measured thereby can be registered and recorded by mechanism in all respects similar to that hereinabove described with reference to the apparatus for measuring the thickness of the paper and similarly actuated from the axle of roll 50 through a clutch controlled by the relay. But, as shown by way of modification, this relay has contacts which are normally biased to closed position and is arranged to directly control the magnetic clutch, eliminating the intermediate solenoid and pull switch, by connecting line wire $x$ by wire $i'$ through the switch of the relay and thence by wire $j'$ to one side of the clutch magnet coil (not shown) and connecting the other side of the clutch magnet coil back by wire $k'$ to the line wire $y$. Here, the clutch magnet will be energized and the finger of the indicating device will be operatively coupled to the axle of roll 50 whenever and for such time as the commutators are out of phase and relay $22^a$ is de-energized, and will be released therefrom, and returned to zero position, by the actuation of the relay when the commutators are in phase.

In case the apparatus is to be operated by alternating, instead of direct, currents a transformer may be substituted for the relay 22, the relay $22^a$, the primary winding of the transformer replacing the magnet coil of the relay and the secondary thereof supplying current to the solenoid 24 or directly to the clutch magnet as the case may be.

While I have shown and described what I now consider to be the best embodiments of the several features of my invention, in its application to a paper machine, and have suggested certain modifications in the details thereof, it is to be understood that the several features of the invention may be further modified in their details and that one or more of these features may be used either without the others or with equivalents therefor, within the scope of the appended claims, without departing from the spirit or sacrificing the substantial advantages thereof.

What I claim as new, and desire to secure by Letters Patent, is:—

1. The method of measuring the thickness of sheet material and the like which comprises as steps therein causing the material to travel in the arc of a circle and determining the differential speed of its inner and outer surfaces while travelling in such arcuate path in its relationship to the radius of the path.

2. Apparatus for measuring the thickness of sheet material and the like comprising as elements thereof means for causing the material to travel in the arc of a circle and means for measuring the differential speed of its inner and outer surfaces while travelling in such arcuate path.

3. Apparatus for measuring the thickness of sheet material and the like comprising, as elements thereof, means for causing the material to travel in the arc of a circle, two members driven to travel one at a speed proportional to that of the inner surface and the other at a speed proportional to that of the outer surface of the material while travelling in such arcuate path, an electric circuit, and means associated with said members respectively for controlling the electric circuit.

4. Apparatus of the type described comprising, in combination with two surfaces travelling at different speeds, an electric circuit, and controlling said circuit two jointly operative control members driven at speeds proportional one to the speed of one and the other to the speed of the other travelling surface and adapted to effectively make and break the circuit at a frequency directly proportional and for time intervals inversely proportional to the speed difference of said travelling surfaces.

5. Apparatus of the type described comprising, in combination with two surfaces travelling at different speeds, an electric circuit, means including two commutator-like members driven at speeds proportional to the speed of travel of said surfaces respectively for controlling the electric circuit to effectively make and break the circuit at a frequency directly proportional and for time intervals inversely proportional to the speed difference of said travelling surfaces, and a measuring device including a movably mounted element normally biased to a given starting position and means controlled by the electric circuit for moving said movable member at a speed proportional to that of one of said travelling surfaces and for a time interval inversely proportional to the speed difference of said travelling surfaces and then releasing it.

6. Apparatus of the type described comprising, in combination with two surfaces travelling at different speeds, an electric circuit, means including two commutator-like members driven at speeds proportional to the speed of travel of said surfaces respectively for effectively making and breaking the circuit at a frequency directly proportional and for time intervals inversely proportional to the speed difference of said surfaces, and a measuring device including a movably mounted element normally biased to a given starting position and means controlled by the electric circuit for alternately moving said element at a speed proportional to the speed of one of said travelling surfaces and then allowing said element to be returned to and remain at its starting position during time intervals inversely proportional to the speed difference of said two surfaces.

7. Apparatus of the type described comprising, in combination with an electric circuit, two rotary members driven at speeds which are different and means on each member jointly operative during the operation of said members to effectively make and break the electric circuit at a frequency directly proportional and for time intervals inversely proportional to the difference in the speed thereof.

8. Apparatus of the type described comprising, in combination with two machine parts driven to travel at different speeds, means for measuring said difference in speed including an electric circuit, and two commutator-like members driven at speeds proportional respectively to the speeds of the two machine parts and jointly operative to effectively make and break the circuit at a frequency proportional and for time intervals inversely proportional to the speed difference of said parts.

9. Apparatus of the type described, comprising, in combination with two moving surfaces travelling at different speeds, an electric circuit, means for controlling said circuit including two commutator-like members driven at speeds proportional one to the speed of one and the other to the speed of the other of the moving surfaces and jointly operative to so make and break the circuit that it will be effectively broken at a frequency directly proportional and will remain effectively broken for time intervals inversely proportional to the speed difference of said surfaces, a movably mounted element, and means controlled by the electric circuit for driving said element at a speed proportional to the speed of one of the moving surfaces.

10. In apparatus of the type described, the combination of two moving surfaces travelling at different speeds, an electric circuit, two members driven at speeds proportional the one to the speed of one and the other to the speed of the other of said moving surfaces and carrying means operative to control the electric circuit, a movably mounted element, and means controlled in turn by the electric circuit for driving said element at a speed proportional to the speed of one of the moving surfaces and operative under such control to drive said element during alternate time intervals inversely proportional to the speed difference of said two moving surfaces.

11. In apparatus of the type described, the combination, with two moving surfaces travelling at different speeds, of an electric circuit, means for controlling said circuit including two commutator-like members driven at speeds proportional the one to the speed of one and the other to the speed of the other of the moving surfaces and jointly operative to effectively make and break the circuit at a frequency rate directly proportional and for time intervals inversely proportional to the speed difference of said surfaces, a movably mounted element, means controlled by the electric circuit for driving said element at a speed proportional to the speed of one of the moving surfaces, and an indicator device controlled by said element.

12. In apparatus of the type described, the combination, with two moving surfaces travelling at different speeds, of an electric circuit, two members driven respectively at speeds proportional to the speeds of said moving surfaces and means on each member operative by their joint action to make and break the electric circuit, a differential speed indicating device, means for actuating the indicating device at a rate of movement proportional to the speed of one of said moving surfaces, and means controlled by the electric circuit for alternately connecting and disconnecting said indicating device with and from the indicator actuating means for time intervals each substantially equal to the time interval between the effective closure of the electric circuit and the reclosure thereof after the same has been effectively opened.

13. Apparatus for measuring the thickness of sheet and similar articles of manufacture, comprising means for causing the article the thickness of which is to be measured to travel in the arc of a circle, an electric circuit, and means for effectively making and breaking the circuit at a frequency rate directly proportional and for time intervals inversely proportional to the speed difference of the inner and outer surfaces of the article as it travels through said arc of a circle.

14. In apparatus for measuring the thickness of sheet and similar articles of manufacture, the combination of means for causing the article to travel in the arc of a circle, an electric circuit, means for effectively making and breaking the circuit at a frequency rate directly proportional and maintaining the circuit open for time intervals inversely proportional to the speed difference of the inner and outer surfaces of the article as it travels through said arc of a circle, and means for measuring the length of alternate time intervals between successive effective closures of the circuit.

15. In apparatus for measuring the thickness of sheet and similar articles of manufacture, the combination of a roll over which the moving article is carried in the arc of a circle and travels therewith, a commutator driven at a sped proportional to the speed of said roll, a second commutator bearing against the outer surface of the moving article at a point within its arcuate path and rotated thereby, a relay with circuit controlled by the two commutators jointly whereby the relay will be energized and de-energized at a frequency rate directly proportional and will remain de-energized for time intervals inversely proportional to the speed difference of the inner and outer surfaces of the article while moving through said arcuate path, and an indicating device with driving and control means operative under the control of said relay to measure the length of the time intervals between successive energizations of the relay.

16. In apparatus for measuring the thickness of sheet and similar articles of manufacture, the combination of a roll over which the moving article is carried in the arc of a circle and travels therewith, a commutator driven at a speed proportional to the speed of said roll, a second commutator bearing against the outer surface of the moving article at a point within its arcuate path and rotated thereby, an electric circuit controlled by the two commutators jointly, an indicating device with movable arm normally biased to a zero starting point, and means controlled by the electric circuit for actuating the indicating device at a speed proportional to the speed of said roll whereby the indicating device will be so actuated and will be returned to and remain at its starting point, alternately, during time intervals inversely proportional to the speed difference of the two surfaces of said moving article.

17. In apparatus for measuring the thickness of sheet and similar articles of manufacture, the combination of a roll over which the moving article is carried through the arc of a circle and travels therewith, a commutator connected up and driven at a speed proportional to the speed of said roll, a second commutator bearing against the outer surface of the moving article at a point within its arcute path and rotated thereby, an electric circuit controlled by the two commutators jointly to thereby effectively open and close at a frequency directly proportional and to remain open and closed for time intervals inversely proportional to the speed difference of the inner and outer surfaces of the article while moving through said arcuate path, an indicating device with movable arm normally biased to zero starting position, means for actuating the indicating device at a speed proportional to the speed of said roll, and means controlled by the electric circuit whereby the indicating device will be connected with its actuating means and will be disconnected therefrom and released to return to its starting position, alternately, for time intervals inversely proportional to the speed difference of the two arcuate surfaces of said article.

18. In apparatus for measuring the thickness of sheet and similar articles of manufacture, the combination of means for causing the article to travel in the arc of a circle, two commutators driven at speeds proportional respectively to the speeds of the inner and outer surfaces of the article while travelling through said arcuate path, an electric circuit controlled by the two commutators jointly, a movably mounted element, and means controlled by the electric circuit for driving said element at a speed proportional to the linear speed of travel of the article.

19. In apparatus for measuring the thickness of sheet and similar articles of manufacture, the combination of means for causing the article to travel in the arc of a circle, two commutators driven at speeds proportional respectively to the speeds of the inner and outer surfaces of the article while travelling through said arcuate path, an electric circuit controlled by the two commutators jointly, a member driven at a speed proportional to the speed of linear travel of the article, a movably mounted element, and a clutch connection between said element and said driven member controlled by the electric circuit.

20. In apparatus for measuring the thickness of sheet and similar articles of manufacture, the combination of a roll over which the moving article is carried in the arc of a circle and travels therewith, a commutator driven at a speed proportional to the speed of said roll, a second commutator bearing against the outer surface of the moving article at a point within its arcuate path and rotated thereby, an electric circuit controlled by the two commutators jointly, and indicating means comprising a member driven at a speed proportional to the linear speed of travel of the moving article, a movably mounted indicating element, and a clutch connection between the indicating element and the driven member controlled by the electric circuit whereby the indicating element will be operatively connected with and disconnected from the driven member, alternately, for time intervals inversely proportional to the thickness of said moving article.

GEORGE F. FRENCH.